United States Patent [19]
Mallie

[11] Patent Number: 5,377,240
[45] Date of Patent: Dec. 27, 1994

[54] TRANSFER CARRIAGE WITH INTERCHANGEABLE BASKETS

[75] Inventor: Frank J. Mallie, San Jose, Calif.

[73] Assignee: General Electric Company, San Jose, Calif.

[21] Appl. No.: 139,125

[22] Filed: Oct. 21, 1993

[51] Int. Cl.⁵ .............................. G21C 19/00
[52] U.S. Cl. .............................. 376/264; 376/271; 376/268
[58] Field of Search .............. 376/268, 269, 270, 271, 376/264

[56] References Cited

U.S. PATENT DOCUMENTS

| | | | |
|---|---|---|---|
| 4,482,520 | 11/1984 | Randazza | 376/271 |
| 4,487,741 | 12/1984 | Vuckovich et al. | 376/271 |
| 4,824,633 | 4/1989 | Ichikawa et al. | 376/268 |
| 5,084,231 | 1/1992 | Dixon et al. | 376/271 |
| 5,085,824 | 2/1992 | Busch et al. | 376/268 |
| 5,104,612 | 4/1992 | Rousar | 376/248 |

Primary Examiner—Donald P. Walsh
Assistant Examiner—Frederick H. Voss
Attorney, Agent, or Firm—J. S. Beulick

[57] ABSTRACT

An improved system for transferring fuel bundles and control blades between a fuel storage pool and a fuel core of a nuclear reactor. The transfer system includes a carriage which is movable horizontally along a track which is submerged in a transfer pool. The carriage has a slot for receiving interchangeable baskets of different configurations and capacities. One basket is designed to receive a fuel bundle assembly; another basket is designed to receive a control blade. These baskets have the same mounting hardware. The basic construction of the carriage and baskets is aluminum with accessories of stainless steel. Each basket can be hung on the carriage and locked in place with a bolt. Each basket has a bail for handling with existing grapples. When not in use, the baskets are stored and locked in place on a storage rack.

20 Claims, 9 Drawing Sheets

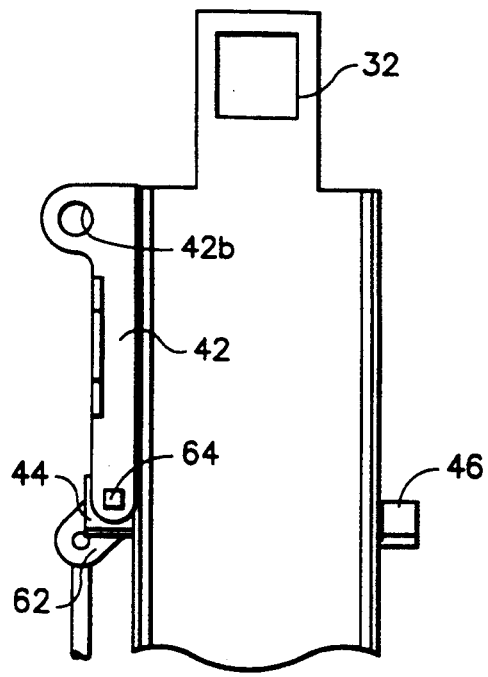
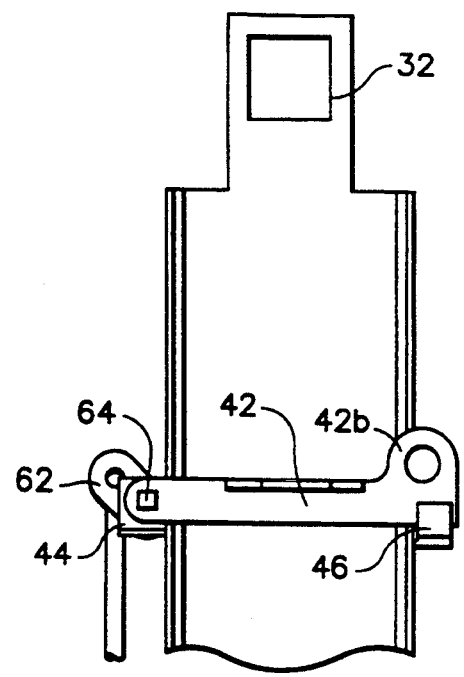
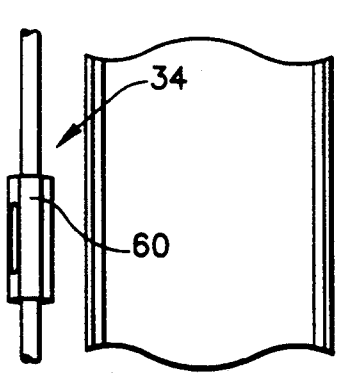
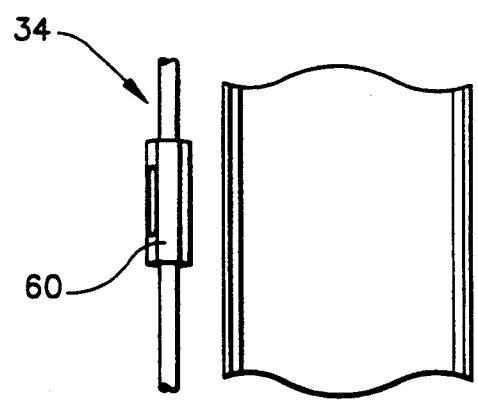
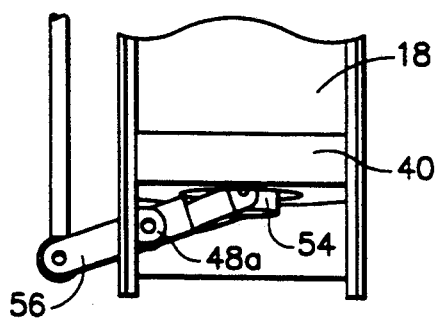
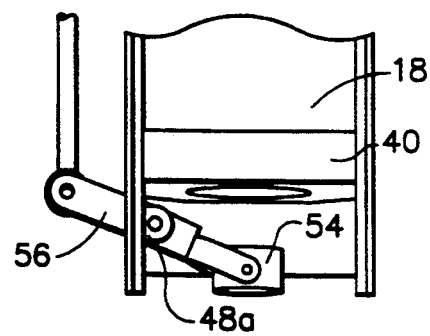
FIG. 6A　　　　FIG. 6B

TRANSFER CARRIAGE WITH INTERCHANGEABLE BASKETS

FIELD OF THE INVENTION

This invention generally relates to the refueling of a nuclear reactor by the removal of spent fuel bundle assemblies and the installation of new fuel bundle assemblies. In particular, the invention relates to apparatus for transferring fuel bundle assemblies between a storage pool and the core of a nuclear reactor.

BACKGROUND OF THE INVENTION

Large-capacity power-generating nuclear fission reactor plants normally have several hundred sealed tubular containers for housing fissionable fuel. To facilitate periodic refueling, which commonly is performed by replacing fractional portions of the total fuel at intervals and rearranging other fractional portions, these fuel rods or pins are conventionally assembled into bundles or groups of elements which can be manipulated as a single composite unit.

The fuel rods of each bundle are held mutually parallel and spaced apart by mechanical means. A typical fuel bundle comprises, for example, an $8 \times 8$ or $9 \times 9$ array of spaced fuel rods. Each fuel rod is usually more than 10 ft long, e.g., 14 ft, and approximately $\frac{1}{2}$ inch in diameter.

To inhibit the fuel rods from bowing and vibrating due to high heat and high velocity of the coolant flowing past, the fuel rods are maintained in their spaced-apart relation by a plurality of spacers positioned at intervals along their length. Typical spacers for fuel rods comprise a lattice having a plurality of openings arranged in the designated pattern for spacing the parallel aligned fuel rods. The assembled bundle of a group of spaced-apart, parallel aligned fuel rods additionally each have their ends supported in corresponding sockets of upper and lower tie plates.

The typical fuel bundle assembly also comprises an open-ended tubular channel of suitable cross section, such as square, which surrounds the fuel rods. The fuel channel directs the flow of coolant longitudinally along the surface of the fuel rods and channels the neutron-absorbing fission control blades, which reciprocate longitudinally intermediate a $2 \times 2$ array of channeled fuel bundle assemblies.

A bail or handle is connected to the upper tie plate. When a hoist is coupled to the bail, the fuel bundle assembly can be lifted and transported as a unit. When supported by a hoist, the fuel bundle assembly hangs in a generally vertical position.

New fuel bundle assemblies are conventionally stored in racks installed in a new fuel storage pool. During an outage, spent fuel is removed from the reactor and replaced with new fuel. The new fuel storage pool has a depth which is sufficient for storage of new fuel, but insufficient for storage of spent fuel just removed from the reactor. The spent fuel coming from the reactor must be transferred to a deep pool as soon as it leaves the reactor. To accomplish this, fuel coming from the reactor is moved to the transfer pool where it is moved by the carriage of the fuel transport system to the spent fuel storage pool. At this time the carriage must return to the pickup area to accept another fuel bundle.

During a conventional refueling operation of the reactor core, about 25% or more of spent or burned fuel bundles within the reactor core are replaced with fresh fuel bundles. An upper pool of water is typically located above the reactor core for providing, for example, shielding of radiation from the fuel bundles, and a conventional bridge or gantry is movable over the pool for refueling the reactor core. The bridge includes a trolley-mounted grapple which is telescopically extended downwardly through the pool and into the reactor core to grab one of the fuel bundles by its handle at the too thereof, and is then retracted upwardly to remove the fuel bundle. The fuel bundle is continuously maintained underwater to provide shielding thereof as well as for allowing water to flow upwardly through the fuel bundle to cool it. This prevents overheating due to the continuation of nuclear reactions therein which occur at a level which is substantially reduced relative to that occurring in an operating reactor core.

In a one-bridge refueling system, each spent fuel bundle is removed from the core, translated horizontally through the upper pool to an adjacent fuel storage pool and placed vertically in one of a horizontal array of storage racks. The spent fuel bundles are stored for up to several years until such time when the spent fuel is to be relocated to a long-term storage site. A fresh fuel bundle is then transported by the bridge from the fuel storage pool back to the reactor core and positioned therein. Since a typical reactor includes several hundred fuel bundles, a substantial amount of time is required to remove the spent fuel bundles and replace them with fresh fuel bundles.

Furthermore, in a single-bridge system, conventional fuel shipping casks, which may weigh up to about 100 tons, must be individually lifted into the fuel storage pool so that the spent fuel bundles may be inserted therein. The lifting of such a heavy cask entails a risk that the cask may drop and consequently damage the pool and/or the fuel bundles.

Another type of refueling system used in most PWRs and some BWRs uses two bridges with a transfer machine therebetween. One bridge carries individual fresh or spent fuel bundles between the reactor core and the transfer machine, and the other bridge transports individual spent or fresh fuel bundles between the transfer machine and the fuel storage pool. The transfer machine then conveys the spent and fresh fuel bundles between the two bridges. In this way, an entire refueling operation may be carried out in less time than is needed when using a single bridge since the two bridges and transfer machine may be synchronized while being operated contemporaneously, with each transport device carrying a respective fuel bundle. This system also eliminates the risk of dropping a shipping cask into the storage pool since one of the bridges may be used for transporting fuel between separate pools containing the stored fuel and the shipping casks.

In this two-bridge system, the two bridges are typically located in separate buildings, one containing the reactor core and another containing the fuel storage pool. The common wall between the two buildings must necessarily provide a seal for radiation and pressure between the two buildings and therefore requires a relatively complex transfer tube extending therebetween through which fuel bundles are transferred. The transfer tube is typically oriented either horizontally or at an incline so that the passage between the two buildings is relatively small, thereby reducing the complexity of the required seals therebetween. It is desirable to transport the fuel bundles primarily in an upright position as they are moved laterally or sideways through the respective pools so that water may continually flow vertically upwardly therethrough for cooling the fuel bundles. The fuel bundles must, therefore, necessarily be temporarily upended or moved from their vertical position to an inclined or horizontal position for passage through the transfer tube. The conventional transfer machine therefore provides an upending device at one end of the transfer tube to initially rotate a vertical fuel bundle to the required horizontal position for passage through the transfer tube, and another upending device at the other end thereof to return the fuel bundle to the preferred vertical position. Suitable seals are provided at both ends of the transfer tube to prevent leakage of the water therethrough.

When the fuel bundles are positioned horizontally, natural convection cooling by the water being channeled therethrough is reduced since the vertical path therethrough has been reduced or eliminated. Accordingly, the fuel bundle must be transported relatively quickly through the transfer tube to reduce the likelihood of overheating of the fuel bundles, and additional procedures must be established to provide effective cooling in the event of any failure of the transfer machine while the fuel bundles are upended.

When control blades are also removed, the process changes slightly. Since the control blades are not as radioactive as the fuel, the control blades can be stored temporarily in the new fuel storage pool. This is accomplished using racks especially designed to store control blades. When all the fuel leaving the reactor has been moved to the spent fuel storage pool, the control blades can be moved.

A fuel transfer system is disclosed in copending U.S. patent application Ser. No. 07/834,947 to Townsend et al. entitled "Fuel Transfer System", wherein fuel bundles may be continuously maintained in an upright position during the entire refueling operation. That fuel transfer system includes a transfer pool containing water at a level above the reactor core. A fuel transfer machine installed underwater in the transfer pool includes a carriage for transporting fuel bundles. The carriage is selectively movable through the water in the transfer pool and individual fuel bundles are carried while being held upright on the carriage. A first movable bridge is disposed over an upper pool containing the reactor core and a second movable bridge is disposed over a fuel storage pool, with the transfer pool being disposed therebetween. A fuel bundle may be moved by the first bridge from the reactor core and loaded into the carriage, which transports the fuel bundle to the second bridge, which in turn picks up the fuel bundle and carries it to the fuel storage pool. However, the carriages of the fuel transfer system of Townsend et al. lack the capacity to carry both fuel bundles and control blades.

SUMMARY OF THE INVENTION

The present invention is an improved system for transferring fuel bundles and control blades between a fuel storage pool and a reactor core. The fuel transfer system comprises a carriage which is movable horizontally along a track. The carriage has a slot for receiving interchangeable baskets of different configurations and capacities. One basket is designed to receive a fuel bundle assembly; another basket is designed to receive a control blade. These baskets have the same mounting hardware. The basic construction of the carriage and baskets is aluminum with accessories of stainless steel.

The fuel transfer system in accordance with the preferred embodiment of the invention is capable of transporting either fuel bundle assemblies or control blades, despite the differences in configurations and weights of those nuclear reactor components. The invention can be used to safely and securely transport fuel from the reactor to the spent fuel storage area and control blades from the new fuel storage area to the spent fuel storage area. Both of these operations are carried out with minimal manpower and minimal exposure of personnel to radiation.

Each of the interchangeable baskets can be hung on the carriage and locked in place with a bolt. Each basket has a bail for handling with existing grapples. When not in use, the baskets are stored and locked in place on a storage rack.

Depending on whether fuel bundle assemblies or control blades are to be transported, the appropriate basket is removed from the storage rack using a grapple and the locked onto the carriage. A hoist is used to lift either a fuel bundle assembly or a control blade out of the reactor and transport the lifted component to a position overlying the carriage. With the appropriate basket in place, the component to be transported is lowered into the basket from the side. Lowering of the component to the bottom of the basket activates a locking mechanism which holds the component in place.

After the carriage has transported the component through the transfer pool to a position alongside the gate to the fuel storage pool, the refueling machine is operated to lift the component out of the basket. This lifting operation actuates the locking mechanism on the basket to open, allowing the component to be lifted out of the basket sideways and then transported to the fuel storage pool.

During a seismic event, fuel bundles would have a tendency to fall out of side-open baskets. To maintain a high level of safety during loading, the fuel remains grappled until it is secured in the fuel transport basket and then the fuel is ungrappled. During removal of the fuel bundle assembly, the fuel transfer basket remains locked until the fuel is grappled and lifted.

In accordance with the preferred embodiment of the invention, each transfer basket comprises an aluminum channel having an open side to enable the fuel bundle assembly or control blade to be side-loaded. The transport basket is provided at the bottom with a contact plate having an undeflected position when the basket is unloaded and a deflected position when the basket is loaded. The contact plate is actuated by the weight of the fuel bundle assembly or control blade. The contact plate is mechanically linked to a latching mechanism arranged at the top of the channel. When the contact plate is undeflected, the latching mechanism is in an open position for allowing a component being transported to pass through during either loading or unloading. When the contact plate is deflected, the latching mechanism is closed to retain the component in the channel during transport. As a result of the mechanical linkage between the contact plate and the latching mechanism, a transported component cannot be removed from its basket until after it has been lifted.

and incorporating a transfer carriage for carrying a basket in accordance with the invention.

Figure 1:
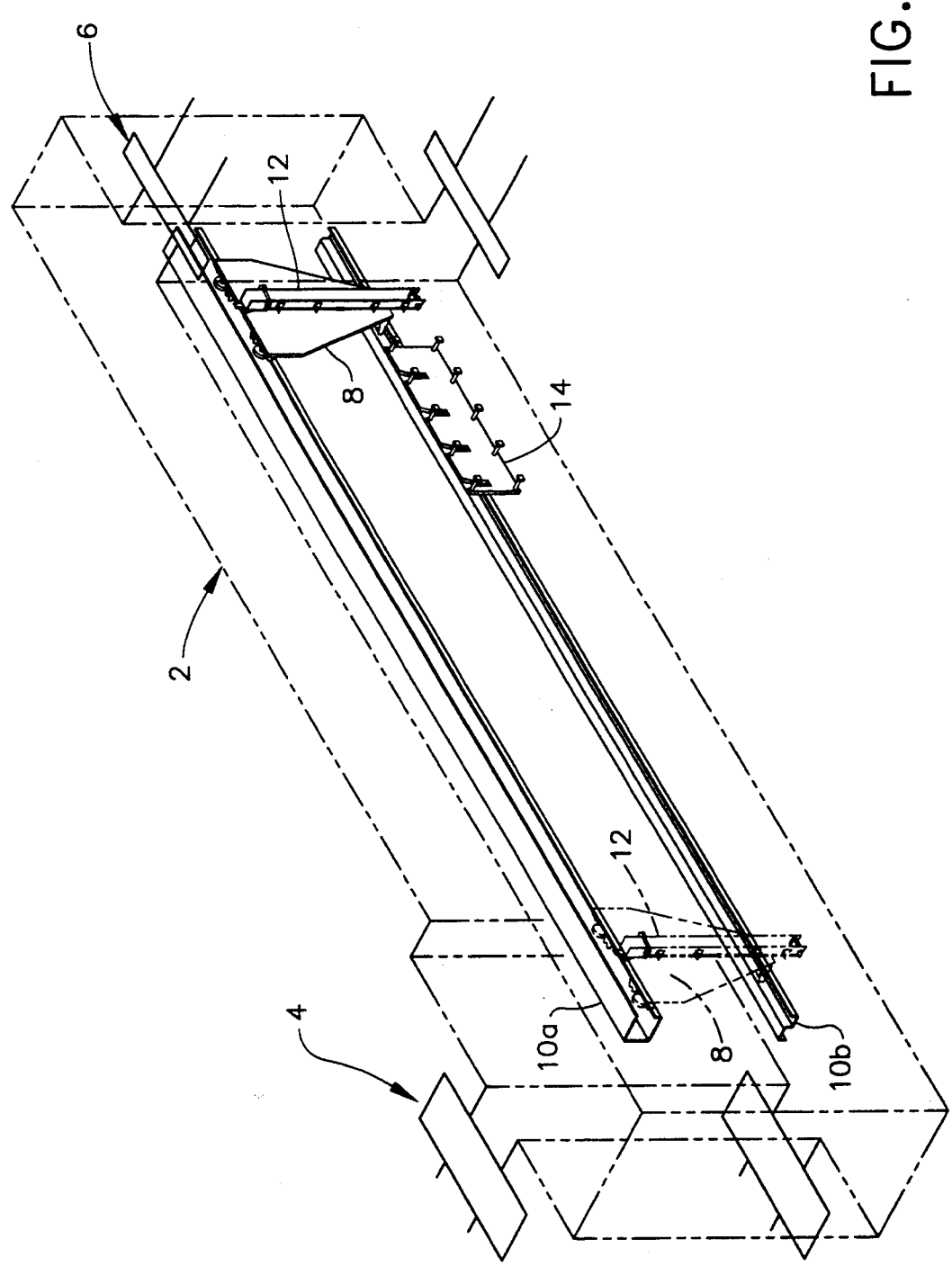
FIG. 1 is a perspective view of a fuel transfer system installed in a fuel transfer pool (depicted in phantom)
Figure 2:
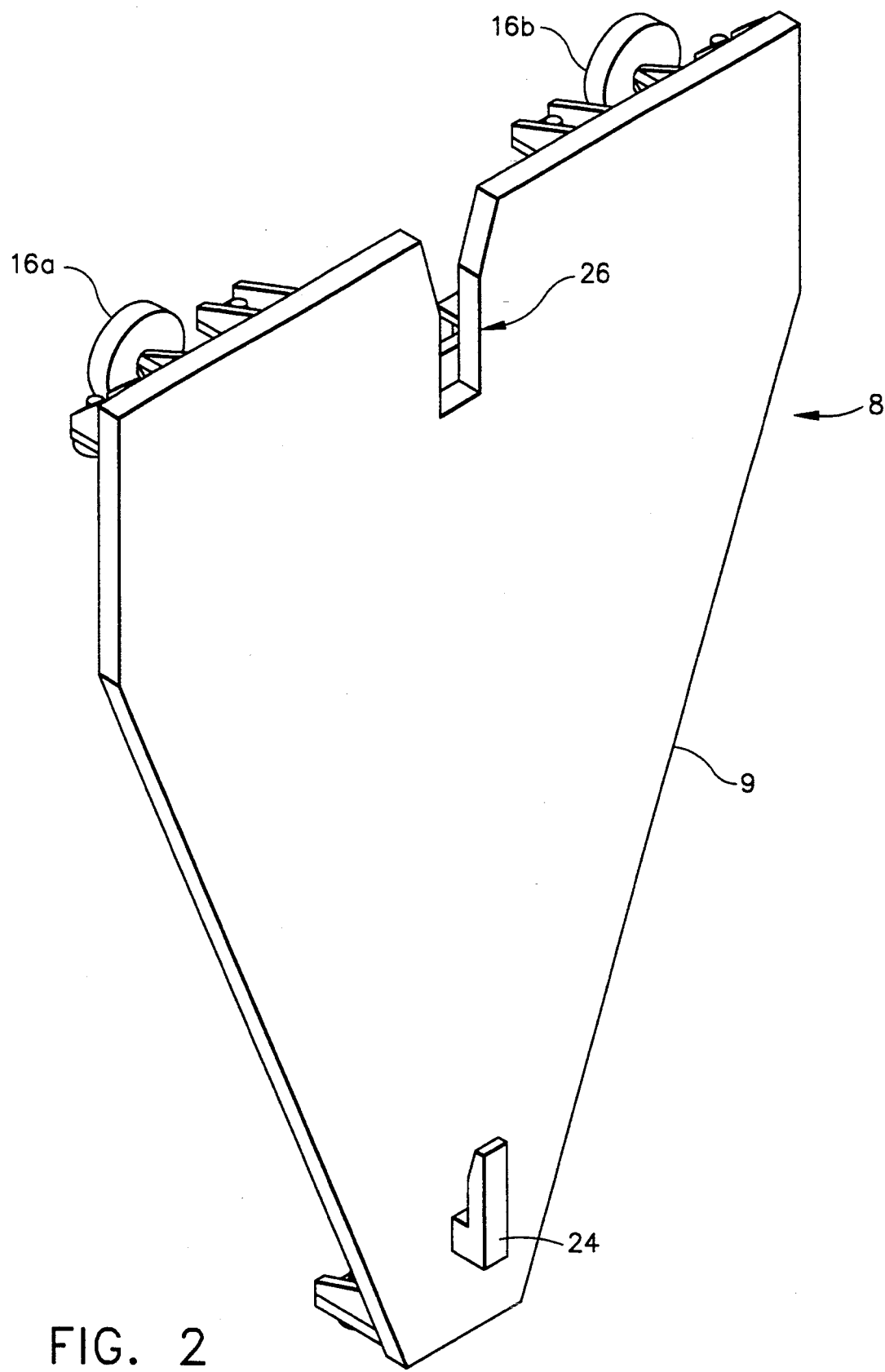

FIG. 2 is a perspective view of a transfer carriage in accordance with a preferred embodiment of the invention.

Figure 3:
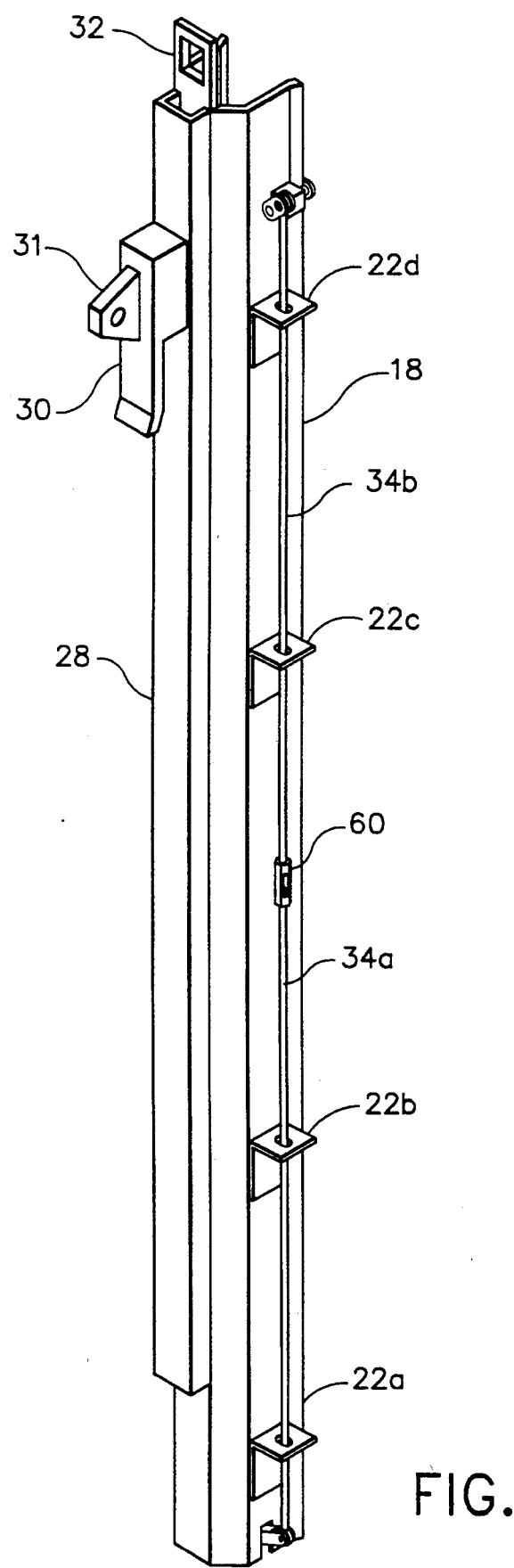
Figure 5:
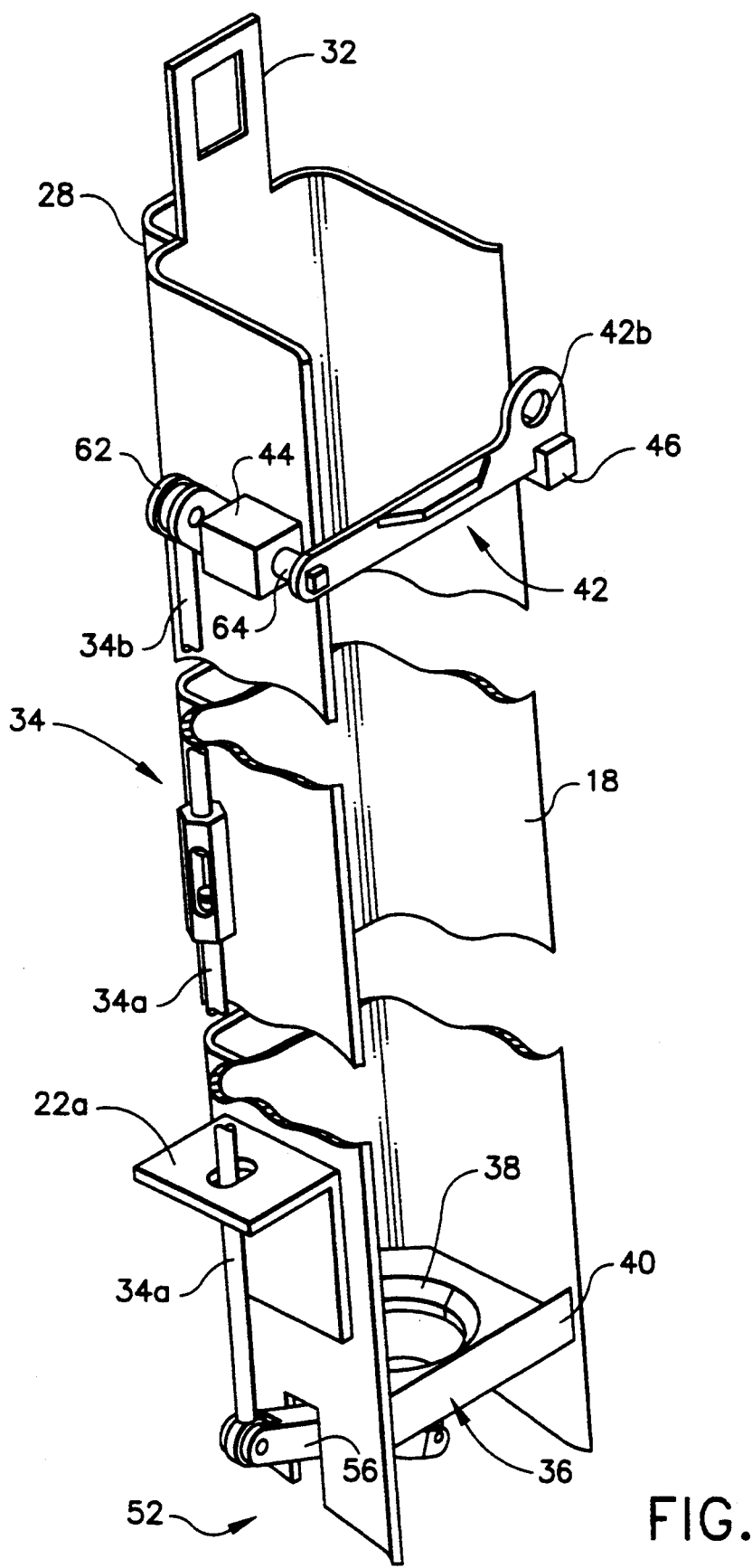

FIGS. 3 and 5 are perspective views, from the rear and front respectively, of a transfer basket in accordance with the preferred embodiment of the invention.

Figure 4:
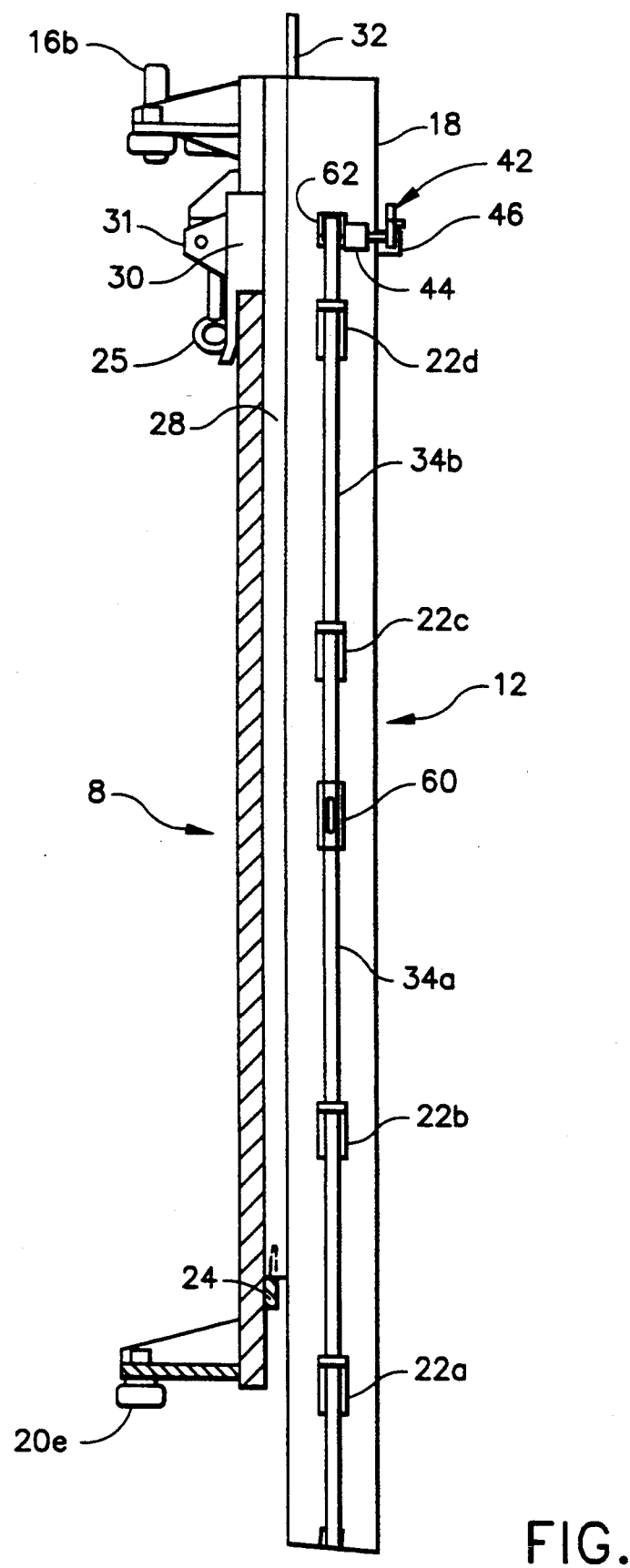
Figure 7:
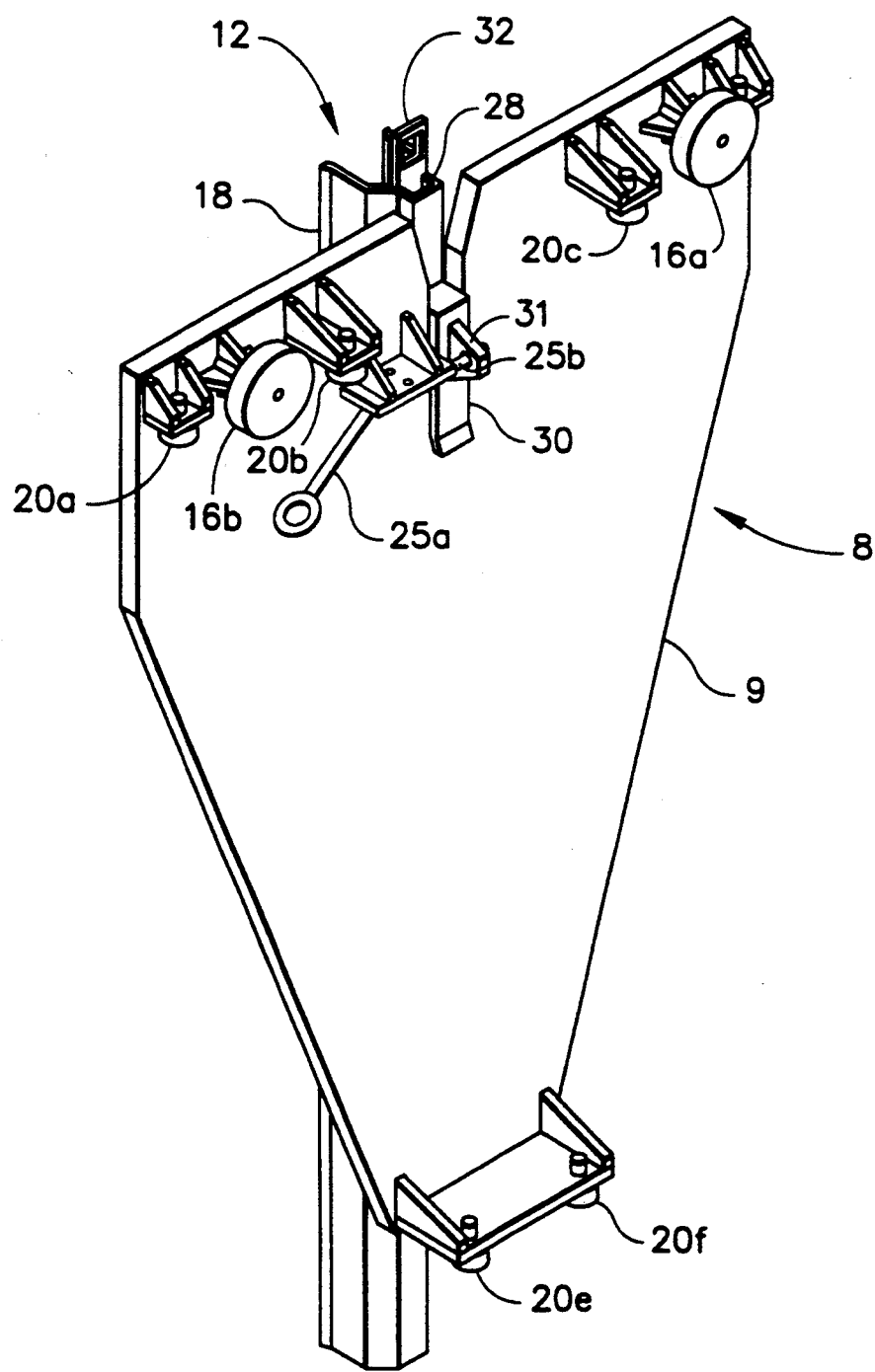

FIGS. 4 and 7 are side and perspective views respectively showing a transfer basket coupled to a transfer carriage in accordance with the preferred embodiment of the invention.

FIGS. 6A and 6B are front views of the transfer basket of FIGS. 3 and 4 in the unlocked and locked states, respectively.

Figure 8:
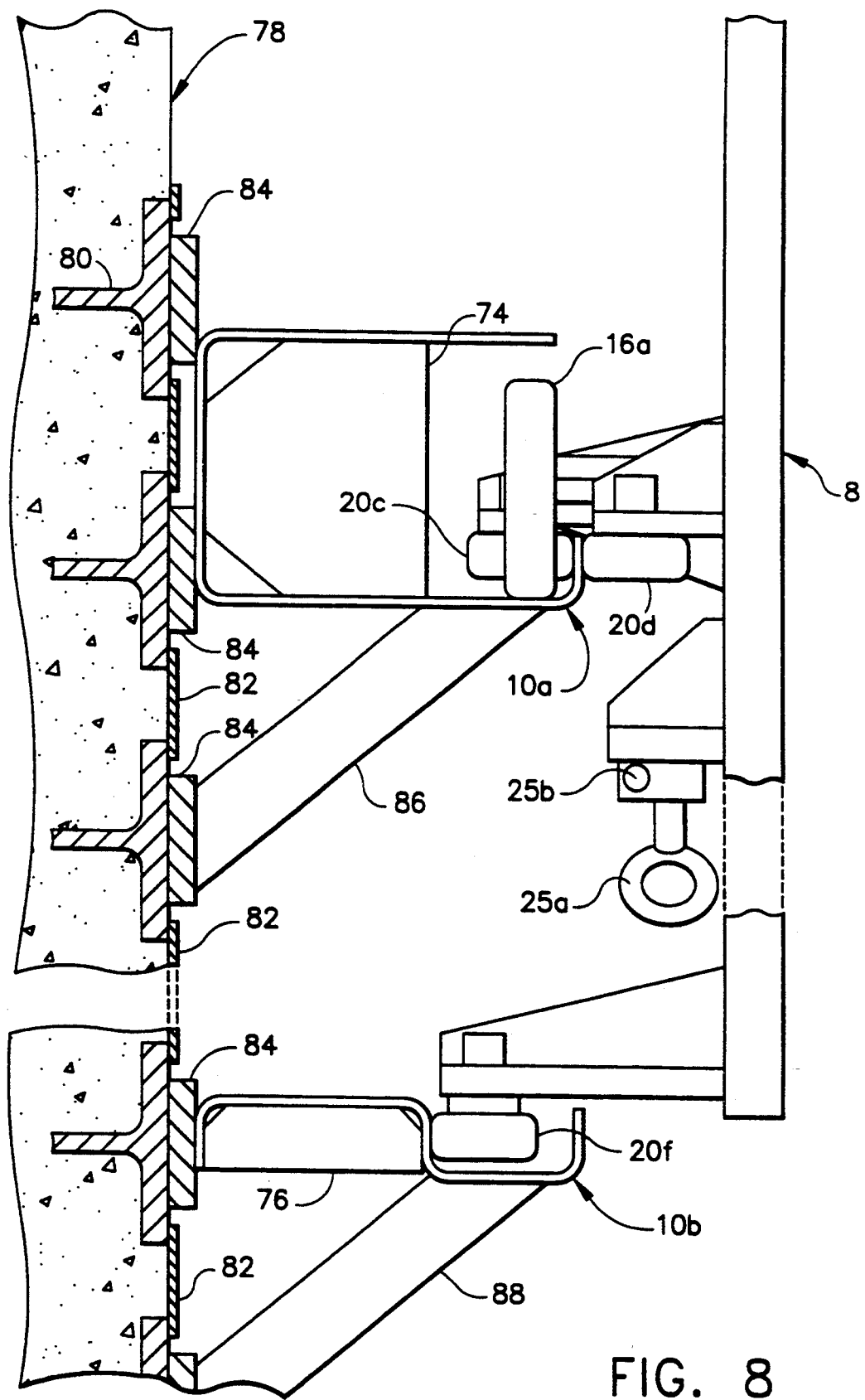

FIG. 8 is an end view of portions of a transfer carriage mounted on tracks in accordance with the invention.

Figure 9:
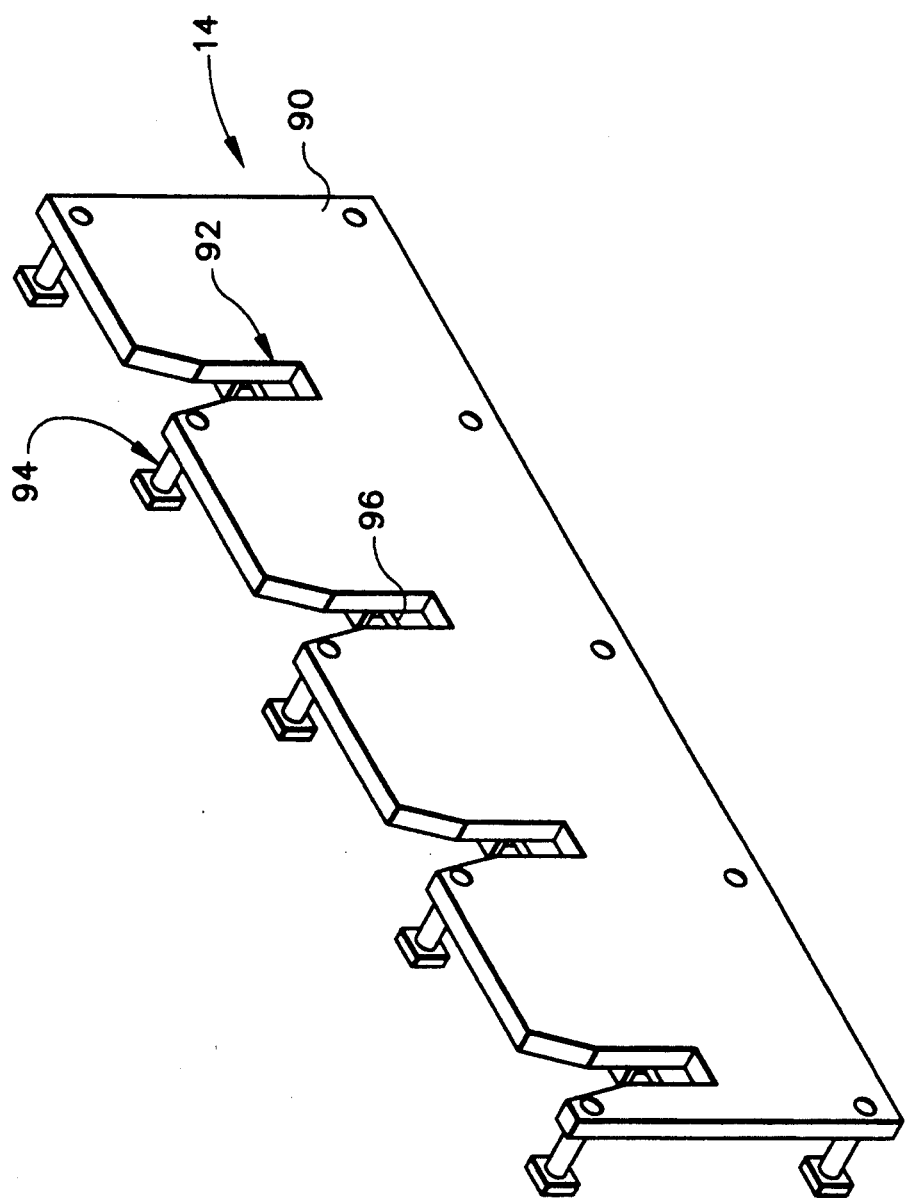

FIG. 9 is a perspective view of a basket storage rack in accordance with the preferred embodiment of the invention.

DETAILED DESCRIPTION OF THE PREFERRED EMBODIMENTS

The fuel transfer system in accordance with the invention is installed in a fuel transfer pool 2 filled with water. A gate 4 is provided between fuel transfer pool 2 and a water-filled fuel storage pool (not shown); and a gate 6 is provided between fuel transfer pool 2 and a water-filled upper pool (not shown) overlying the reactor core of a boiling water reactor. When gates 4 and 6 are opened, new fuel bundles can be transferred from the fuel storage pool to the reactor cavity without lifting the new fuel bundle out of the water. Further, during the refueling operation, the spent fuel bundles are transferred from the reactor cavity to the spent fuel storage pool by way of open gate 6 fuel transfer pool 2 and open gate 4 in that order. As was the case for the new fuel bundles, each spent fuel bundle can be transferred to the fuel transfer pool without lifting the spent fuel bundle out of the water.

The fuel transfer system comprises a carriage 8 mounted on tracks 10a and 10b, which tracks are mounted securely on the back wall of fuel transfer pool 2. In accordance with the preferred embodiment of the invention, a basket 12 can be releasably coupled to carriage 8. Basket 12 can be removed from the carriage and stored on a storage rack 14 mounted on the front wall of fuel transfer pool 2.

The transfer carriage 8 in accordance with the invention is shown in FIGS. 2, 4, 7 and 8. The carriage includes a vertical frame 9 in the form of a flat plate and various support members extending therefrom for rotatably supporting a plurality of rollers. The carriage has two wheels 16a and 16b (with horizontal axes of rotation) which roll on upper track 10a. Movement in directions transverse to the tracks is prevented by six rollers 20a–20f (with vertical axes of rotation).

Rollers 20e and 20f bear against a vertical section of track 10b, which is braced by a stiffener plate 76. Tracks 10a and 10b are mounted on a concrete wall 78 having stainless steel imbedments 80 and a pool liner 82 made of ¼-inch-thick stainless steel. The tracks are mounted via mounting plates 84 (½-inch-thick stainless steel) and support members 86 and 88 by suitable weldments.

The carriage is also equipped with a lower basket clip 24 and an alignment slot 26 (see FIG. 2) for coupling to interchangeable baskets of different configuration, but having identical mounting hardware. A transfer basket 8 in accordance with the invention is shown in FIGS. 2, 4, 7 and 8.

Each transfer basket 12 comprises an aluminum channel 18 formed by bending ¼-inch stock. Referring to FIG. 5, an aluminum support plate 36 is welded inside channel 18 near its bottom. Support plate 36 has a chamfered seating aperture 38 and a front lip 40. A latch 42 is mounted near the top of channel 18. Initially latch 42 must be in an open position, as shown in FIG. 6A. A hoist (not shown) is translated to move the fuel bundle assembly (not shown) into the open channel 18. At this juncture, the hoist coupling is lowered until the bottom end of the fuel bundle is seated in seating aperture 38.

A mechanical linking assembly is provided which causes latch 42 to close in response to proper seating of the fuel bundle. This assembly comprises a plurality of active linking elements supported by a plurality of passive support elements, which components will be described with reference to FIGS. 5, 6A and 6B.

The passive support elements include a latch block 44 welded to the outside upper left side of channel 18; a lock block 46 welded to the outside upper right side of channel 18; a pair of lever blocks 48 (only one of which is shown in FIGS. 6A and 6B) welded to the inside lower left side of channel 18; and four bent angles 22a, 22b, 22c and 22d (see FIG. 4) which are welded to the outer left side of the channel at four different elevations. Also a slot 52 is cut into the lower left side of channel 18, extending upward from the bottom edge.

The active linking elements include a contact plate 54 pivotably coupled to two prongs of a Y-shaped lever 56. Contact plate 54 lies directly underneath the seating aperture 38 and may be cup-shaped for receiving the bottom end of the fuel bundle assembly which has passed through aperture 38. A pivot pin mounted in lever blocks 48 acts as a pivot for lever 56, which fits through slot 52. As lever 56 rotates relative to blocks 48, contact plate 54 rotates relative to lever 56 to maintain a constant orientation while in contact with the bottom end of the fuel bundle assembly.

Actuation rod 34 consists of a lower actuation rod portion 34a rigidly connected to an upper actuation rod portion 34b by a turnbuckle 60. The lower end of lower actuation rod portion 34a is pivotably coupled to lever 56 by a pivot pin 54d. Lower actuation rod portion 34a slides through holes in angles 22a and 22b; upper actuation rod portion 34b slides through holes in angles 22c and 22d. As lever 56 rotates in a clockwise direction in response to depression of contact plate 54 as depicted in FIGS. 6A and 6B, actuation rod 34 rises.

The upper end of upper actuation rod portion 34b is pivotably coupled to one end of a latch clevis 62 by a pivot pin. The other end of latch clevis 62 is rigidly connected to a latch shaft 64 which is pivotably supported by latch block 44. The other end of latch shaft 64 is rigidly connected to one end of latch 42. Thus, in response to elevation of actuation rod 34, latch 42 rotates through an angle of approximately 90 degrees from the unlocked position shown in FIG. 6A to the locked position shown in FIG. 6B. In the locked position, the remote end of latch 42 sits in a slot cut in lock block 46. Latch 42, when locked, prevents the transferred fuel bundle assembly from falling out of channel 18 in the event of a seismic or other disturbance.

The actuation rod portions 34a and 34b and the turnbuckle 60 are made of stainless steel, whereas the latch 42, contact plate 54 and lever 56 are made of aluminum.

The mechanical linking assembly is designed so that when a fuel bundle assembly nested in a transfer basket 16 is lifted, the weight of the stainless steel actuation rod causes the latch 42 to return to its open position. Latch 42 is further provided with a lifting eye 42b, which enables an operator to open the latch by means of a grapple hook (not shown) if any component of the mechanical linking assembly has failed.

Each transfer basket is provided with identical mounting hardware so that baskets having different configurations can be interchangeably mounted on the transfer carriage. Referring to FIG. 3, a channel 28 welded to the back wall of transfer channel 18. The back wall of channel 28 in turn has an upper basket clip 30 welded thereon. As best seen in FIG. 7, upper basket clip 30 couples with alignment slot 26 of transfer carriage 8. As best seen in FIG. 4, lower basket clip 24 on plate 9 of carriage 8 couples with the bottom of channel 28 of basket 12. The two clips act as hooks to hold the basket against the carriage.

A locking plate 31 extends from upper basket clip 30. Locking plate 31 has an aperture for receiving a pin 25b (see FIG. 7), which is slidable into and out of the aperture by manipulation of lever arm 25a. Lever arm 25a ends in an eyelet which can be lifted up or pushed down using conventional reactor tools to respectively unlock or lock the basket on the carriage. The rotation of the lever arm 25a produces sliding of pin 25b via any conventional mechanism, such as a rack and pinion.

The back wall of channel 18 of transfer basket 12 has an apertured extension 32 which receives the fuel grapple for lifting the basket off of the carriage. The removed basket can be stored on storage rack 14 (shown in detail in FIG. 9). Storage rack 14 comprises a vertical plate 90 mounted on the front wall of the transfer pool via wall mounts 94, with a gap between the wall and rack to provide room for the upper basket clip 30. Clip 30 couples with any one of storage slots 92 to enable baskets to be stored on the rack when not in use. Stored baskets are locked in place via locking bolts 96 mounted on the wall side of rack 14.

The transfer carriage with interchangeable baskets of the invention has application in the transfer of fuel bundle assemblies, control blades and other elongated objects. Although the dimensions of the transfer basket must conform to the dimensions of the object being transported, the mounting hardware is the same. Also variations and modifications of the mechanical linking assembly will be apparent to a skilled mechanical engineer. All such variations and modifications are intended to be encompassed by the claims set forth hereinafter.

I claim:

1. A system for transferring fuel bundles and control rods of a nuclear reactor while submerged in a pool of liquid, comprising:
   a transfer carriage comprising a rigid support plate and means for rolling along a horizontal travel path between first and second positions, said rolling means being supported on said rigid support plate, said rolling means and said rigid support plate being submerged in said pool of water during travel along said horizontal travel path; and
   a first transfer basket having mounting hardware for coupling and uncoupling said first transfer basket to and from said rigid support plate, said first transfer basket being dimensioned and configured to hold a fuel bundle and being positioned during coupling with said rigid support plate such that said first transfer basket is submerged in said pool of water during travel of said transfer carriage along said horizontal travel path.

2. The transfer system as defined in claim 1, wherein said mounting hardware comprises a hook-shaped member, said carriage having a slot for receiving said hook-shaped member.

3. The transfer system as defined in claim 2, wherein said carriage further comprises:
   a rigid support member having said slot formed therein, said slot extending vertically downward from a top edge of said rigid support member; and
   means for locking said mounting hardware in said slot.

4. The transfer system as defined in claim 2, wherein said mounting hardware further comprises first locking means and said carriage further comprises second locking means, said first and second locking means preventing removal of said basket from said carriage when manipulated into a state of mutual engagement and allowing removal of said first transfer basket from said carriage when manipulated into a state of mutual disengagement.

5. The transfer system as defined in claim 3, wherein said locking means comprises a pivotable lever arm and a locking pin which slides in response to pivoting of said lever arm.

6. The transfer system as defined in claim 1, further comprising a second transfer basket having mounting hardware identical to said mounting hardware of said first transfer basket, said second basket being dimensioned and configured to hold a control rod, said first and second transfer baskets being interchangeably mountable on said rigid support plate.

7. The transfer system as defined in claim 6, wherein said first transfer basket comprises:
   means for supporting said fuel bundle in a channel having an open side; and
   means for blocking passage of said fuel bundle through said open side of said channel, said blocking means being movable from a non-blocking position to a blocking position in response to displacement of said fuel bundle from a first object position whereat said supporting means does not support said fuel bundle to a second object position whereat said supporting means supports said fuel bundle, said blocking means being mounted on said channel.

8. The transfer system as defined in claim 7, wherein said blocking means comprises:
   a rotatable latch which rotates between a first latch position whereat said latch blocks passage of said fuel bundle through said open side of said channel and a second latch position whereat said latch does not block passage of said fuel bundle through said open side of said channel; and
   a slotted lock block welded to said channel, said lock block being positioned to receive said latch in said slot when said latch is in said first latch position.

9. The transfer system as defined in claim 8, wherein said blocking means further comprises:
   a rotatable lever which rotates in response to displacement of said fuel bundle from said first object position to said second object position; and
   a rigid actuation rod pivotably coupled to said lever and to said latch for causing rotation of said latch in response to rotation of said lever.

10. The transfer system as defined in claim 7, wherein the weight distribution of said blocking means is such that said latch is rotated from said first latch position to said second latch position under the force of gravity alone in response to displacement of said fuel bundle from said second object position to said first object position.

11. A carriage for transferring interchangeable baskets having different configurations but identical mounting hardware, comprising:
   a rigid support plate having a slot for receiving said mounting hardware, said slot being open at one end;
   rolling means rotatably coupled to said rigid support plate and disposed to roll about an axis which is perpendicular to a plane of said rigid support plate; and
   means for locking said mounting hardware in said slot.

12. The transfer carriage as defined in claim 11, wherein said slot extends from a top edge of said rigid support plate.

13. The transfer carriage as defined in claim 1i, wherein said locking means comprises a pivotable lever arm and a locking pin which slides in response to pivoting of said lever arm.

14. A transfer basket for holding an elongated component of a nuclear reactor during transfer by a movable transfer carriage, said nuclear reactor component being selected from the group consisting of fuel bundles and control rods, comprising:
   a rigid channel of U-shaped cross section having an open side of length and width sufficient to allow passage of said elongated component therethrough;
   means for supporting said elongated component in said channel;
   means for mounting said basket on said transfer carriage; and
   means for blocking passage of said elongated component through said open side of said channel, said blocking means being movable from a non-blocking position to a blocking position in response to displacement of said elongated component from a first object position whereat said object supporting means does not support said elongated component to a second object position whereat said object supporting means supports said elongated component, said blocking means being mounted on said channel.

15. The transfer basket as defined in claim 14, wherein said blocking means comprises:
   a rotatable latch which rotates between a first latch position whereat said latch blocks passage of said elongated component through said open side of said channel and a second latch position whereat said latch does not block passage of said elongated component through said open side of said channel; and
   a slotted lock block welded to said channel, said lock block being positioned to receive said latch in said slot when said latch is in said first latch position.

16. The transfer basket as defined in claim 15, wherein said blocking means further comprises a rotatable lever which rotates in response to displacement of said elongated component from said first object position to said second object position, and a rigid actuation rod pivotably coupled to said lever and to said latch for causing rotation of said latch in response to rotation of said lever.

17. The transfer basket as defined in claim 15, wherein the weight distribution of said blocking means is such that said latch is rotated from said first latch position to said second latch position under the force of gravity alone in response to displacement of said elongated component from said second object position to said first object position.

18. The transfer basket as defined in claim 17, wherein said actuation rod is made of stainless steel, and said channel, said latch and said lever are made of aluminum.

19. The transfer basket as defined in claim 14, wherein said mounting means comprises a clip having a locking plate connected thereto.

20. A storage rack for storing objects having identical mounting hardware submerged in a liquid-filled pool, comprising:
   a rigid support plate having a plurality of slots spaced at intervals along an edge of said plate, each slot having an open end shaped to receive said mounting hardware on one of said objects and a closed end shaped to support said mounting hardware of said one object;
   means for mounting said rigid support plate in a vertical position on a wall of said pool so that a predetermined gap exists between said wall and said slots open in an upward direction; and
   means for locking said mounting hardware in said slot, said locking means being mounted on the side of said rigid support means which faces said wall of said pool.

* * * * *